US009774733B2

(12) United States Patent
Keiser et al.

(10) Patent No.: US 9,774,733 B2
(45) Date of Patent: Sep. 26, 2017

(54) CRIME REPORTING IN A CONTROLLED-ENVIRONMENT FACILITY

(71) Applicant: Securus Technologies, Inc., Dallas, TX (US)

(72) Inventors: Luke Keiser, Frisco, TX (US); Adam Christopher Edwards, Fort Worth, TX (US)

(73) Assignee: Securus Technologies, Inc., Carrollton, TX (US)

( * ) Notice: Subject to any disclaimer, the term of this patent is extended or adjusted under 35 U.S.C. 154(b) by 1012 days.

(21) Appl. No.: 13/920,348

(22) Filed: Jun. 18, 2013

(65) Prior Publication Data

US 2013/0279686 A1 Oct. 24, 2013

Related U.S. Application Data

(63) Continuation of application No. 13/086,379, filed on Apr. 13, 2011, now Pat. No. 8,467,381.

(51) Int. Cl.
*H04M 3/51* (2006.01)
*H04L 12/64* (2006.01)
*H04M 11/04* (2006.01)

(52) U.S. Cl.
CPC ....... *H04M 3/5116* (2013.01); *H04L 12/6418* (2013.01); *H04M 3/5166* (2013.01); *H04M 11/04* (2013.01)

(58) Field of Classification Search
CPC .................................................. H04M 3/5116
USPC ....... 379/266.07, 45, 142.05, 142.06, 142.07
See application file for complete search history.

(56) References Cited

U.S. PATENT DOCUMENTS

| | | | | |
|---|---|---|---|---|
| 5,644,629 A * | 7/1997 | Chow | .................... | H04M 1/663 379/142.05 |
| 7,106,843 B1 * | 9/2006 | Gainsboro | .......... | H04M 3/2281 379/191 |
| 8,296,245 B2 * | 10/2012 | Barber | .................... | G06F 21/31 705/325 |
| 2001/0036821 A1 * | 11/2001 | Gainsboro | .......... | H04M 3/2281 455/410 |
| 2002/0116247 A1 * | 8/2002 | Tucker | .................... | G06Q 30/06 709/224 |
| 2003/0088645 A1 * | 5/2003 | Ferraro | .................... | G06Q 10/10 709/218 |
| 2004/0111377 A1 * | 6/2004 | Teberg | ................. | G06Q 20/383 705/74 |
| 2004/0203575 A1 * | 10/2004 | Chin | ..................... | H04M 3/436 455/404.1 |
| 2005/0075116 A1 * | 4/2005 | Laird | ....................... | A61B 5/04 455/456.3 |

(Continued)

OTHER PUBLICATIONS

DSI ITI, "PREA Action Line", archived Dec. 25, 2010 from dsiiti.com/documents/PREA%20Flyer.pdf.

(Continued)

*Primary Examiner* — Parth Patel
(74) *Attorney, Agent, or Firm* — Fogarty LLP

(57) ABSTRACT

Embodiments of the invention are directed to communication systems and methods that allow a resident of a controlled environment facility to report a past, on-going or threatened crime, such as a rape. The resident is able to make the report using a facility communications system without alerting other residents of the controlled environment facility that the crime has been reported.

16 Claims, 2 Drawing Sheets

(56) References Cited

U.S. PATENT DOCUMENTS

| | | | | |
|---|---|---|---|---|
| 2006/0229995 A1* | 10/2006 | Ferraro | ............... | G06Q 20/383 |
| | | | | 705/74 |
| 2007/0003026 A1* | 1/2007 | Hodge | ................. | H04M 3/533 |
| | | | | 379/88.1 |
| 2007/0041516 A1* | 2/2007 | Dickinson | ........... | H04M 3/2281 |
| | | | | 379/45 |
| 2007/0081637 A1* | 4/2007 | Beard | ................. | H04M 3/5166 |
| | | | | 379/88.01 |
| 2007/0132597 A1* | 6/2007 | Rodgers | ............... | A61B 5/1113 |
| | | | | 340/573.1 |
| 2009/0016496 A1* | 1/2009 | Bulmer | ................. | G06Q 10/10 |
| | | | | 379/45 |
| 2009/0195651 A1* | 8/2009 | Leonard | ................... | B60R 1/00 |
| | | | | 348/148 |
| 2010/0027842 A1* | 2/2010 | Guo | .................. | G06K 9/00624 |
| | | | | 382/103 |
| 2011/0070868 A1* | 3/2011 | Scholz | ............... | H04L 12/5855 |
| | | | | 455/412.1 |
| 2011/0317685 A1* | 12/2011 | Torgersrud | ............. | H04L 12/66 |
| | | | | 370/352 |
| 2014/0018059 A1* | 1/2014 | Noonan | ............... | H04W 8/005 |
| | | | | 455/419 |

OTHER PUBLICATIONS

"Suicide legislation", Nov. 28, 2010, Wikipedia, archived Nov. 28, 2010 from en.wikipedia.org/wiki/Laws_against_suide, p. 3.

* cited by examiner

CRIME REPORTING IN A CONTROLLED-ENVIRONMENT FACILITY

CROSS-REFERENCE TO RELATED APPLICATIONS

This application is a continuation of U.S. patent application Ser. No. 13/086,379 filed on Apr. 13, 2011, entitled "Crime Reporting in a Controlled-Environment Facility," which issued on Jun. 18, 2013 as U.S. Pat. No. 8,467,381, the entire contents of which are hereby incorporated by reference herein.

TECHNICAL FIELD

Embodiments of the invention are directed, in general, to correctional facility communications and, more specifically, to communication systems and methods that allow an inmate to report a crime such as a rape.

BACKGROUND

According to a recent Department of Justice press release, federal, state and local correctional authorities reported an estimated 7,374 allegations of sexual victimization involving incarcerated men and women in 2007 and 7,444 in 2008. Upon investigation, 1,932 allegations were substantiated (investigated and determined to have occurred), 3,939 were unfounded (determined not to have occurred) and 7,723 were unsubstantiated (lacking sufficient evidence). These figures indicate that one in seven cases of rape was confirmed after investigation.

Sexual victimization, as defined by Justice Department's Bureau of Justice Statistics (BJS), in compliance with the Prison Rape Elimination Act of 2003, involves both inmate-on-inmate and staff-on-inmate sexual victimization. Inmate-on-inmate sexual victimization includes nonconsensual sexual acts (involving penetration) and abusive sexual contacts (involving sexual touching without an inmate's consent). Staff-on-inmate sexual victimization includes sexual misconduct (involving any behavior or act of a sexual nature directed toward an inmate by staff) and sexual harassment (involving repeated verbal statements or comments of a sexual nature to an inmate by staff).

More than half (993) of all substantiated incidents were perpetrated by another inmate. More than fifty percent of these incidents (503) involved nonconsensual sexual acts. Among all substantiated incidents of inmate-on-inmate sexual victimization, 69 percent involved force or threat force, offers of protection or favors, bribery, blackmail or other type of pressure.

Staff was involved in 939 incidents of sexual misconduct or harassment (515 in 2007 and 424 in 2008). In more than 60 percent of the incidents, the sexual relationship between staff and inmate "appeared willing," although inmates by law are unable to consent. The majority of incidents (87 percent) involved staff sexual misconduct.

SUMMARY

Embodiments of the invention are directed to communication systems and methods that allow an inmate to report a crime such as a rape. Inmates at prisons and jails are typically subject to tight restrictions on their ability to contact people outside the facility. These restrictions exist in part to prevent inmates from contacting victims and witnesses of crimes for which they are accused or convicted. The limitations on outside contact are also intended to prevent inmates from conducting criminal activities or contacting current and former gang members and partners in crime while the inmate is incarcerated. Inmates are usually only allowed to make calls to pre-screened telephone numbers. These limitations make it difficult for an inmate to report a crime such as rape, particularly, if facility staff is involved in the crime.

BRIEF DESCRIPTION OF THE DRAWINGS

Figure 1:
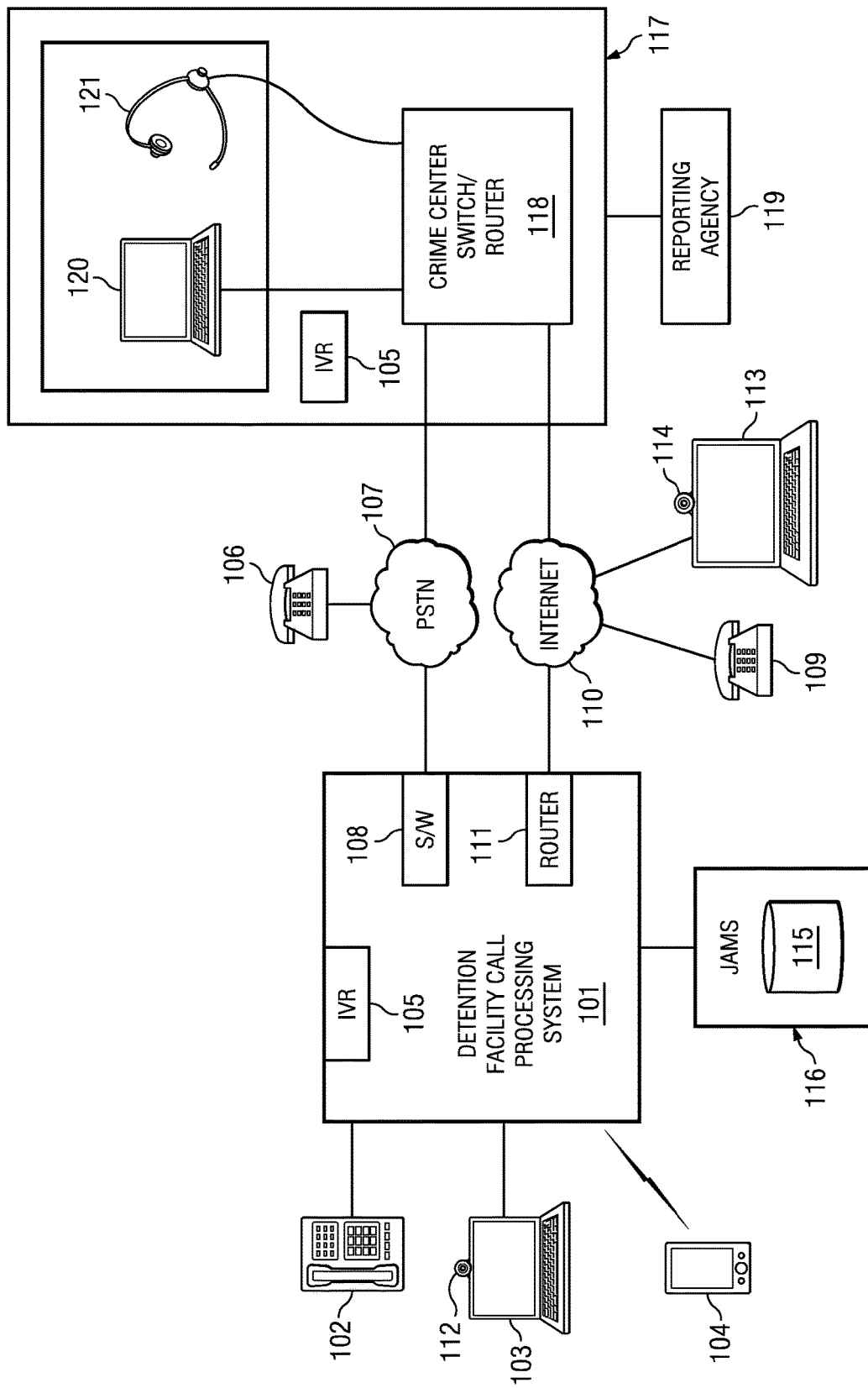
Figure 2:
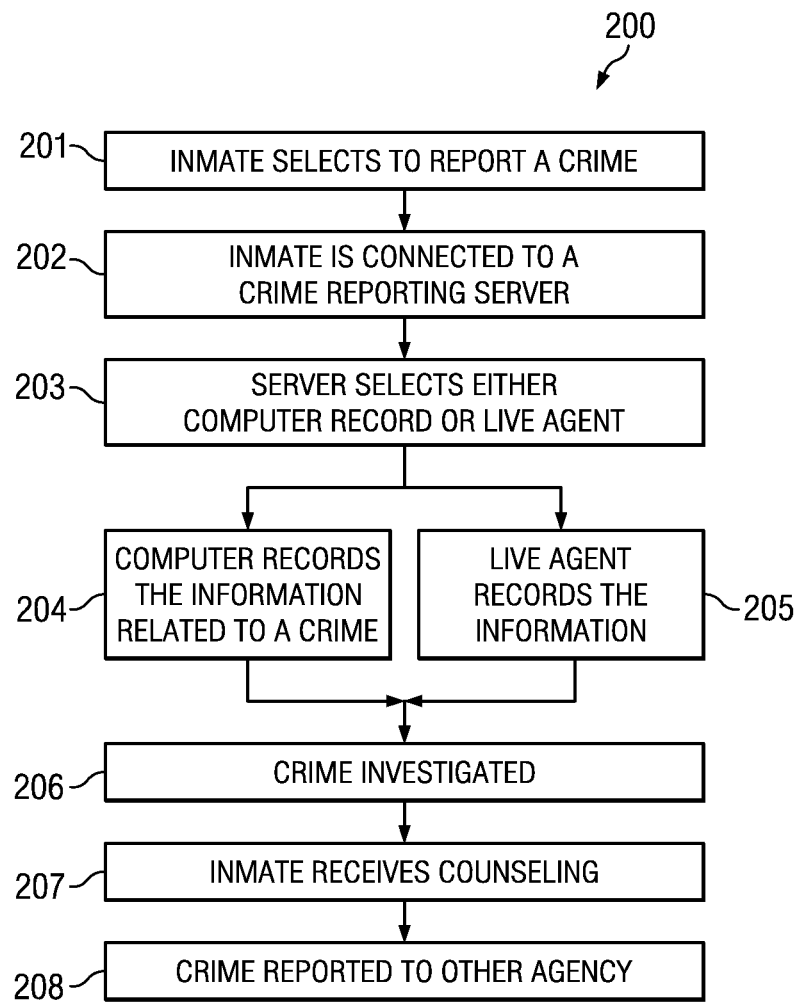

Having thus described the invention in general terms, reference will now be made to the accompanying drawings, which are not necessarily drawn to scale, and wherein:

FIG. 1 is a high-level block diagram of a communications system that facilitates communications between an inmate and other parties; and FIG. 2 depicts an example of process of an inmate reporting a crime using the system of FIG. 1.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 is a high-level block diagram of a communications system that facilitates communications between an inmate and other parties. Communications system 101 provides telephone services to one or more correctional facilities, such as a prison, jail, detention facility, boot camp, labor camp, other reformatory, or other penitentiary. Call processing system 101 may be located at a particular correctional facility for which it provides calling services. Alternatively, call processing system 101 may be centrally or remotely located with respect to one or more correctional facilities and may provide calling services to multiple correctional facilities. In particular, call processing system 101 provides telephone services to inmates, prisoners, detainees, arrestees or other individuals that are restricted to and a resident of the correctional facility.

Inmates use telephone 102 to access telephone services. In some facilities, inmates may also use a personal computer or kiosk 103 or wireless device 104 to access telephone services. An inmate initiates telephone services by using one of the telephone 102, the kiosk 103, or the wireless device 104. At that time, the inmate may be prompted to provide a personal identification number (PIN), other identifying information or biometrics. Call processing system 101 may include an interactive voice response (IVR) unit 105 that generates and plays prompts or other messages to inmates on the device-in-use, 102, 103, or 104.

Under the control of call processing system 101, the device-in-use 102, 103, or 104 may be connected to friends and family at telephone 106 across a publicly switched telephone network (PSTN) 107. Telephone 106 may be located at a home, inmate visitation center, or other facility. Switch 108 in call processing system 101 is used to connect calls across PSTN 107.

In an alternative arrangement, the inmate's friends and family may be at telephone 109, which is on a Voice over IP (VoIP) or packet data network 110. Router 111 in call processing system 101 is used to route data packets associated with a call connection to destination telephone 109. The terms switch and router are intended to be used as interchangeable herein. The terms switch and router as used in the description of the call center system are both intended to cover a device that connects circuit-switched and packet-switched telephone call connections.

The inmate and called party may also communicate via video call. Computer or kiosk 103 may have a camera 112, and a called party may have a personal or laptop computer 113 with a camera 114. The video call connection between the parties maybe established and supported by an organization or commercial service that provides computer services and software for use in telecommunications and VOIP, such as SKYPE®. Alternatively, the correctional facility and the destination may use H323 videoconferencing equipment.

Call processing system 101 ensures that the inmate's calls are connected only to numbers on an approved PAN list. Each inmate's PAN list may be stored, for example, in an inmate profile in a database 115. The PAN list and other inmate profile data may be maintained by a jail administration and management system (JAMS) 116. The inmate profile data may include balances for inmate trust and calling accounts; trial schedules; conviction data; criminal records; sentencing data, such as time served, time remaining to be served, and release dates; cell and cellmate assignments; inmate restrictions and warnings; order history; telephone call history; call recordings; known or suspected gang or criminal affiliations; known or suspected affiliates, accomplices, or gang members; and any other information that is relevant or useful to correctional facility staff to house and maintain inmates.

In one embodiment, inmates may use the device-in-use, 102, 103, or 104, to report a crime. The crime may be in the past, in the future, or on-going. The crime may be against the inmate or the inmate may be a witness or otherwise have information regarding a crime against another inmate. The crime is reported via crime reporting server 117. Note that although server 117 is shown to be separate from system 101, the server may be incorporated within the system 101. The server 117 may be located at the correctional facility or remote from the facility. If the server 117 is remote from the correctional facility, this may provide more anonymity for the crime report if the facility staff is involved in the crime. The server 117 may serve one or more facilities and may be operated by the correctional facility itself or by a commercial vendor.

In any event, inmates may access sever 117 using device-in-use 102, 103, or 104. An inmate logs-in using a PIN or identifier associated with his or her account. In one embodiment, the server 117 is reached by calling a dedicated phone number or access number. This dedicated number may be automatically listed on every inmate's PAN list or on a non-restricted list. This would allow the dedicated line to be open to allow inmates access to report information.

In another embodiment, the server 117 is selected by the inmate during a call sequence. The system 101 would provide a list of choices to the inmate. One of the choices is to report a crime, whereby the system 101 then connects the inmate to the server 117. For example, if the device-in-use is a telephone 102, 104, then using IVR 105, the inmate may be presented with a list, e.g. press 1 to make a call charged to your account, press 2 to make a collect call, . . . and press 9 to report a crime. As another example, if the device-in-use is a kiosk 103, then the user by be presented with a GUI interface, with buttons that are labeled "make a call charged to your account", "make a collect call", . . . and "report a crime". The list of items provided to the inmate may be selected based upon data stored in the inmate's profile on JAMS database 115. The crime reporting choice may be automatically listed on every inmate's profile on the JAMS database or not on a restricted list. This embodiment allows an inmate to report a crime without having to know the crime reporting number and is not seen by other inmates dialing the number.

In another embodiment, the server 117 is selected by the inmate from a general interface or an interface that has a function other than crime reporting. For example, the interface may allow the inmate to order goods and services. An additional choice for the inmate is to report a crime. For example, if the device-in-use is a telephone 102, 104, then using IVR 105, the inmate may be presented with a list, e.g. press 1 to order cigarettes, press 2 to order candy, . . . and press 9 to report a crime. As another example, if the device-in-use is a kiosk 103, then the user by be presented with a GUI interface, with buttons that are labeled "cigarettes", "candy", . . . and "report a crime". See co-pending U.S. patent application Ser. No. 12/975,077, pending entitled CALL CENTER FOR OFFERING GOODS AND SERVICES TO AN INMATE POPULATION, which issued as U.S. Pat. No. 8,750,486 on Jun. 10, 2014, and which is incorporated herein by reference. The list of items provided to the inmate may be selected based upon data stored in the inmate's profile on JAMS database 115. The crime reporting choice may be automatically listed on every inmate's profile on the JAMS database or not on a restricted list. This embodiment allows an inmate to report a crime without having to know the crime reporting number and is not seen by other inmates dialing the number.

After connecting the inmate to the server 117, the server handles the crime reporting. In one embodiment, the server 117 records the crime report via computer 120, which is then investigated by an investigating entity. The investigating entity may be associated with the correctional facility, may be an agency of the government, or may be a private company contracted to perform investigation.

In another embodiment, the server 117 connects inmates to live agents 121. In this embodiment, the server 117 uses switch/router 118 to connect the inmate to an available agent 121. The agent may be a scribe that records information such as the type of crime, date of crime, place of crime, involved parties, etc. The agent may be a counselor that records information, and treats the inmate. The agent may be an investigating officer that records the information and begins the investigation with this contact. The agent may use a telephone, a workstation, display screen, or combinations thereof to communicate with the inmate. Any number of agents 121 may be supported by the switch/router 118. The agents 121 may be physically located in one or more designated call center facilities. Alternatively, some or all of the agents may work from separate locations, such as their home. The switch/router 118 may treat the remote agents as part of a virtual call center by distributing incoming inmate calls as if all the operators were at co-located. The computer 120 may be used to record information if all agents are busy.

If the agents are live agents, the inmate may be provided a message that the contact will be monitored, and/or a warning that the call will be terminated if any offensive conduct occurs and such. Because inmates are typically not allowed to speak with people outside the prison other than the limited group on an approved PAN list, the inmate may try to keep talking to the agent without reporting a crime. The agent may terminate the contact in such a case.

Another embodiment may use both the live agent 121 and the computer 120. This would allow different crimes to be handled differently. For example, lesser crimes such as theft or bulling may be recorded by the computer 120, while greater crimes such as murder, attempted murder, and rape may be handled by a live agent 121. The server determines which entity will handle the crime report based on information provided by the inmate during the contact. For example, a list of crimes may be provided to the inmate. Crimes that have already occurred may be recorded, while future crimes and on-going crimes may be handled by a live agent. Inmates that have previously reported false crimes, or wasted agent time with non-crime contacts may have their contacts recorded by computer instead of being handled by a live agent. The inmate's profile may be updated to indicate that the inmate is a habitual false reporter, and thus automatically handed to the computer 120.

In another embodiment, the first contact by the inmate may be recorded by the computer 120. Subsequent contacts by the inmate regarding the same crime may be handled by the live agent 121. This would allow for some investigation of the crime to occur before the agent speaks with the inmate. If the agent is a counselor, then the inmate may be provided treatment for the crime with later calls.

In another embodiment, different live agents are connected with the inmate at different times. For example, during initial stages of the investigation, the inmate may be connected with an investigating agent. If the investigating agent determines that a crime did occur, and the crime requires treatment (e.g. a rape), then a counselor agent may be connected with the inmate.

In another embodiment, after the inmate selects to report a crime, the inmate may proceed with another activity, such as making a telephone call that is recorded by the computer 120 or monitored by the agent 121. In this case, information is passed to the server 117 by having the inmate communicate with a third party, such as a family member or attorney.

In another embodiment, the server 117 reports to the crime to a reporting agency. Some types of crimes are required to be reported to government agencies. For example, under the Prison Rape Elimination Act of 2003, rapes occurring in federal prisons should be reported to the Department of Justice. In such a case, the server 117 would send a report to the proper reporting agency or agencies. The report may be sent when the initial crime is reported by the inmate. Updates may be sent as further information is uncovered during investigation. Alternatively, a report may be sent when the investigation is complete.

FIG. 2 depicts an example of process 200 of an inmate reporting a crime using the system of FIG. 1. The process 200 begins when the inmate selects to report a crime box 201. The inmate connected to the crime reporting server 117 by the call system 101, box 202. The crime sever 117 may then select either computer 120 or live agent 121 to record information related to the crime, diamond 203. The process 200 then allows either the computer 102 to record the crime information, box 204, or the live agent to record the crime information, box 205. In any event, in box 206, the crime is investigated by an investigation agent. If necessary, the inmate may receive counseling, if the crime has occurred, box 207. In box 208, the crime is reported to a government agency.

Note that the embodiments have been discussed herein in associating with a correctional facility. However, the embodiments may operate with other types of facilities, such as a retirement center, a mental health facility, an orphanage, a managed care facility, or a hospital, hospice.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A method comprising:
   receiving, at a crime server, information related to a crime from an inmate in a controlled facility in a communication over a facility communications system;
   providing a warning message that information provided by the inmate will be recorded;
   recording the information related to the crime in a data storage device;
   determining, during the communication, whether the crime requires immediate response from a live agent using a call selection policy, including at least determining, during the communication, whether an inmate is subject to a substantial risk of imminent physical harm; and
   selectively connecting the inmate to a live agent for live reporting of the crime, during the communication, in response to a determination, during the communication, that the crime requires immediate response from a live agent.

2. The method of claim 1, wherein determining, during the communication, whether the crime requires immediate response further comprises determining, during the communication, whether any inmate is subject to a substantial risk of imminent sexual abuse.

3. The method of claim 1, further comprising maintaining anonymity of the inmate reporting the crime.

4. The method of claim 1, further comprising recording the time of the alleged crime.

5. The method of claim 1, further comprising generating an incident report based on the information received from the inmate.

6. The method of claim 5, further comprising determining whether the crime needs to be reported to a reporting agency.

7. The method of claim 6, selecting a required reporting agency for reporting the crime in response to a reporting agency selection policy.

8. The method of claim 7, further comprising communicating the incident report to the required reporting agency.

9. The method of claim 1, further comprising determining whether facility staff is involved in the crime.

10. The method of claim 9, further comprising instituting anti-retaliation measures in response to a determination that facility staff is involved in the crime.

11. The method of claim 1, further comprising receiving updated information regarding the crime from one or more inmates in the facility.

12. The method of claim 11, further comprising associating the updated information with the information originally received.

13. The method of claim 12, further comprising updating an incident report associated with the crime in response to receiving the updated information.

14. A system comprising:
a crime server configured to:
receive information related to a crime from an inmate in a controlled facility in a communication over a facility communications system;
provide a warning message that the information provided by the inmate will be recorded;
record the information related to the crime in a data storage device;
determine, during the communication, whether the crime requires immediate response from a live agent using a call selection policy, including at least a determination, during the communication, whether an inmate is subject to a substantial risk of imminent physical harm; and
selectively connect the inmate to a live agent for live reporting of the crime, during the communication, in response to a determination, during the communication, that the crime requires immediate response from a live agent.

15. A communications system that allows for an inmate of a facility to report a crime, the system comprising:
a facility communications system that provides communications with other entities for inmates at the facility; and
a crime server that is connected to the facility communications system that provides a warning message that the information provided by the inmate will be recorded, records information related to the crime received from the inmate and selectively connects the inmate to a live agent for live reporting of the crime, during a communication, in response to a determination, during the communication, that the crime requires immediate response that includes at least a determination, during the communication, whether an inmate is subject to a substantial risk of imminent physical harm.

16. The communications system of claim 15, wherein the crime server is configured to connect the inmate to a live agent, during the communication, in response to a determination, during the communication, that any person is subject to a substantial risk of imminent physical harm.

* * * * *